United States Patent [19]

Huber

[11] 3,851,330

[45] Nov. 26, 1974

[54] AMPLITUDE-TO-PHASE CONVERSION CIRCUIT

[75] Inventor: William H. Huber, Redondo Beach, Calif.

[73] Assignee: TRW Inc., Redondo Beach, Calif.

[22] Filed: Feb. 20, 1973

[21] Appl. No.: 333,749

[52] U.S. Cl. ....... 340/347 SY, 340/347 AD, 321/58, 323/121

[51] Int. Cl. .......... H03k 13/20

[58] Field of Search .......... 340/347 SY, 347 AD; 323/121; 321/51 T; 328/155

[56] References Cited

UNITED STATES PATENTS

| | | | |
|---|---|---|---|
| 2,894,256 | 7/1959 | Kronacher | 340/347 SY |
| 3,227,863 | 1/1966 | Winsor | 235/151.11 |
| 3,505,669 | 4/1970 | Welch | 340/347 SY |

OTHER PUBLICATIONS

G. Kronacher, "A Resolver Encoder Using A Dual Phase Shifter," pp. 21–35, Part H, Sect. 2, Tradic Computer Research Program, Armed Services Technical Info. Agency, Knott Building in Dayton, Ohio.

Susskind, "Notes on Analog-Digital Conversion Techniques," QA76S8 Technol. Press of MIT, 1957, pp. (6-8),(6-20).

*Primary Examiner*—Malcolm A. Morrison
*Assistant Examiner*—Vincent J. Sunderdick
*Attorney, Agent, or Firm*—Daniel T. Anderson, Esq.; Edwin A. Oser, Esq.; Jerry A. Dinardo

[57] ABSTRACT

A circuit for converting the angular position of the shaft of a resolver into a phase shift of a carrier wave.

Such a conversion circuit may be used for generating a binary number representative of the angle of the resolver shaft. The circuit of the invention requires only a single reactive impedance element which is common to the two adders of the circuit. One of the adders generates a first carrier wave having its phase shifted in one sense while the second adder generates a second carrier wave having its phase shifted in the opposite sense whereby the phase shifts correspond to the angle of the input shaft. Errors due to drift of the components of the network interconnecting the resolver with the adders are minimized because only a single reactive impedance element is used which is common to the two adders. Accordingly, the errors due to drift of the reactive impedance element are reduced by at least one order of magnitude over those of known circuits.

10 Claims, 5 Drawing Figures

AMPLITUDE-TO-PHASE CONVERSION CIRCUIT

BACKGROUND OF THE INVENTION

This invention relates generally to amplitude-to-phase conversion circuits and particularly relates to a circuit for generating a phase-shifted output wave where the phase shift is representative of the angle of the input shaft of a resolver.

The prior patent to Kronacher issued on July 7, 1959, U.S. Pat. No. 2,894,256 discloses a conversion circuit for converting amplitude ratios into phase displaced voltages. This patent generally describes the system to which the present invention is directed. In other words the system includes a resolver having an analog input shaft, the angle of which is to be measured. The circuit generates two output signals shifted in phase in opposite senses, the phase shift being directly representative of the angle of the input shaft. The two phase-shifted signals may be fed through a time encoder to generate a binary output number representative of the input shaft angle.

The Kronacher circuit is characterized by the provision of two phase shifting networks, each shifting the phase between the two input signals by 90°. Each of the phase shifting circuits is then connected to an associated adder which may be represented by an operational amplifier. Each of the two phase shifted networks includes a reactive impedance element such as a capacitor or inductor.

It is well known that capacitors or inductors are inherently less stable than resistors. Such reactive impedance elements have a drift depending upon environment, life and the like which is at least ten times as large as that of a resistor. Accordingly, the errors due to the capacitor or inductor of the phase shifting circuit contribute primarily to the encoding accuracy or lack thereof. Therefore, the circuit suggested by Kronacher has an accuracy which is directly limited by the drift of the capacitors or inductors used in the network. Furthermore, circuits of this type may be used in an environment where the temperature may change widely such, for example, as a spacecraft. In that case it is additionally necessary to provide for temperature compensation or else to enclose the conversion circuit in a closed container maintained at a stable temperature.

It is accordingly an object of the present invention to provide an amplitude-to-phase conversion circuit having an accuracy which is an order of magnitude better than that of prior circuits without temperature compensation.

A further object of the present invention is to substantially compensate for aging or drift of the reactive impedance element of the converter circuit.

Another object of the present invention is to provide a conversion circuit of the type discussed which is relatively simple in construction and which requires essentially only resistors which are easy to obtain and to match.

Still a further object of the invention is to provide a conversion circuit which requires substantially no temperature compensation even in an outer space environment.

SUMMARY OF THE INVENTION

In accordance with the present invention the amplitude-to-phase converter requires but a single reactive impedance element. This single impedance element is common to the two adders of the system, one of which generates an output signal shifted in phase in one sense while the other generates a signal shifted in phase in the opposite sense, the phase shifts being directly proportional to the angle of the input shaft.

However, a single reactive impedance element only generates a phase shift of 45° while normally a phase shift of 90° is required to generate the desired output signals. Therefore, a resistive network is provided which so interconnects the resolver to the two adders that effectively a 90° phase shift is obtained.

Because the single reactive impedance element such as a capacitor or an inductor is connected to both of the two output adders changes of the capacitance, for example, due to aging are substantially eliminated or compensated. The resultant error is an order of magnitude smaller than that of known prior art circuits. For the same reason it is not necessary to provide temperature compensation because again such effects are substantially cancelled.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
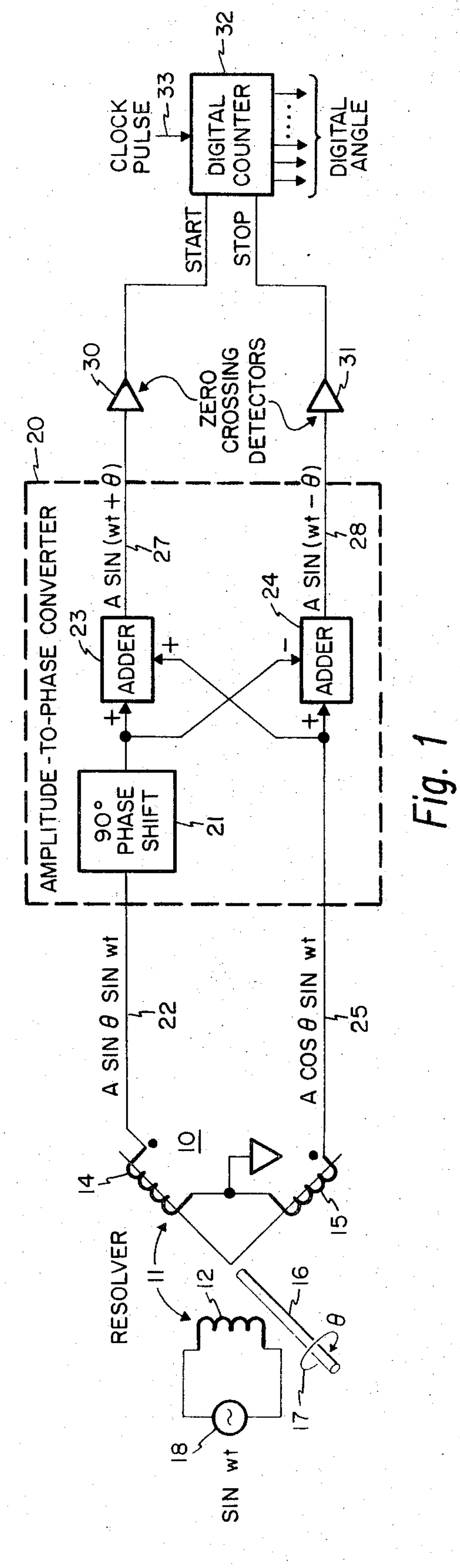
FIG. 1 is a circuit diagram, partly in block form, of a system for converting an input shaft angle into an output binary number.

Referring now to FIG. 1, there is illustrated a system for converting the position of an analog input shaft into a pair of sinusoidal voltages which are then converted into two carrier waves phase shifted in opposite senses, the phase shift being directly proportional to the shaft angle. The two phase-shifted carrier waves are then passed through zero crossing detectors. The resulting signal is then used to start or stop a digital counter to generate a binary number which is directly representative of the shaft angle.

The system of FIG. 1 is generally conventional except for the details of the amplitude to phase converter. The system includes a resolver 10 having a transformer 11 which includes a primary winding 12 and two secondary windings 14 and 15 which are disposed at right angles with respect to each other. The resolver further includes an input shaft 16 which may be rotated as shown by the arrow 17 along with the two secondary windings 14, 15 from a zero position through an angle $\theta$. A carrier wave source 18 is connected across the terminals of the primary winding 12. The carrier wave has been shown in FIG. 1 to generate a sinusoidal wave sin $wt$.

As the analog input shaft 16 is rotated the output windings 14 and 15 are also rotated with respect to the input winding 12. Accordingly, the relative amplitude of the output signals generated by the secondary windings 14 and 15 is varied too. In order to generate the desired output signals the secondary windings 14 has one of its terminals grounded as shown so that a signal A sin $\theta$ sin $wt$ is obtained from the other output terminal. Similarly, the secondary winding 15 has one of its terminals grounded as shown so that from its other winding a signal A cos $\theta$ sin $wt$ appears, the two windings being poled as shown by the dots.

Accordingly, there are developed two carrier waves one of which has its amplitude varied as a sine function of the shaft angle $\theta$ while the other carrier wave has its amplitude varied as a cosine function of the angle $\theta$. However, this modulation may be something other than sinusoidal such as a linear function of the phase angle $\theta$. The two amplitude-modulated signals are now impressed on an amplitude-to-phase converter 20 indicated by the dotted box. Thus, a 90° phase shift network 21 is connected to the output lead 22 from the secondary winding 14. The phase shifted signal is impressed on a first adder 23 as well as on a second adder 24 with its negative value. The adders 23 and 24 may be represented by operational amplifiers with a gain of unity. For example the phase shifted carrier may be impressed onto the negative input terminal of the adder 24.

Similarly, the output signal from the secondary winding 15 is obtained from lead 25 and is impressed both on adders 23 and 24 as shown.

It will be noted that there is only a single 90° phase shift network in accordance with the present invention and its output is impressed on both adders 23 and 24. As a result variations on drift of the reactive impedance element of the phase shift network 21 are substantially cancelled because they enter both adders 23 and 24 and are subtracted from each other. The output of adder 23 obtained from output lead 27 is as follows:

A sin $(wt + \theta)$ Similarly, the output from adder 24 obtained from output lead 28 is as follows:

A sin $(wt - \theta)$ Accordingly, the outputs of the adders are two carrier waves one of which is shifted in phase by $+\theta$ and the other by $-\theta$.

The two carrier waves are now passed through corresponding zero crossing detectors 30 and 31 to start or stop a digital counter 32 which may be timed by a clock pulse 33. The output of detector 30 may be used to start the counter 32 while the output from the other detector 31 is used to stop the counting process. Therefore, the counter will generate a digital number corresponding to twice the phase angle because its output is given by the following equation:

$$+\theta - (-\theta) = 2\theta$$

Accordingly, this system is sometimes referred to as $2\theta$ encoding. In other words the digital output number corresponds to twice the input angle.

It should be noted that the carrier frequency source 18 may be synchronized with the source of the clock pulses 33 or that the carrier wave may be derived from the oscillator generating the clock pulse. It will be evident that the system of FIG. 1 operates as a suppressed carrier system or a suppressed carrier transducer.

In accordance with the present invention the 90° phase shift network 21 of FIG. 1 is replaced by a single reactive impedance element such as a capacitor or an inductor. This will generally yield not a 90° phase shift but a 45° phase shift. Nevertheless, it is possible to provide a simple resistive network together with a 45° phase shift network including a single reactive impedance element to accomplish the amplitude-to-phase conversion of the network 20. Such a system has been shown in FIG. 2 to which reference is now made. The network of FIG. 2 again includes a resolver 10 as previously described. The output lead 22 of the secondary winding 14 again provides the same output signal as previously discussed; namely, A sin $\theta$ sin wt. However, the secondary winding 15 is so arranged that the other terminal is grounded so that output lead 35 will generate the negative carrier wave; namely, $-$A cos $\theta$ sin $wt$.

Input lead 22 is connected by resistor 36 to the negative input terminal of the adder 23. The adder 23 may consist of an operational amplifier of the type having a high gain which is reduced to unity gain by negative feedback. This feedback is provided by resistor 37 connected between the output terminal of the adder 23 and its negative input terminal.

The signal from output lead 35 is also impressed on the negative input terminal of adder 23 through resistor 38.

The 45° phase shift network is realized by capacitor 40 and resistors 41 and 42 connected in series between output lead 22 and the negative input terminal of the adder 24. The same signal is applied through resistor 41 onto the positive input terminal of adder 23. Again the adder 24 has a negative feedback resistor 43 connected between its output terminal and the negative input terminal. The positive input terminal of the adder 24 is grounded as shown.

Two further signals are impressed on the negative input terminal of the adder 24. One signal is obtained from the lead 35 and is applied through a resistor 44. The other signal is applied from output lead 22 through an inverter 45 and a resistor 46. It will be apparent that instead of changing a signal to its inverse or a negative value by an inverter such as 45, it would be equally possible to obtain the signal say from the opposite terminal of a center taped secondary winding 14.

The output signal from adder 23 is obtained from output lead 48 and may be designated by $V_{01}$ which equals A sin$(wt + \theta)$. Similarly, an output signal $V_{02}$ is obtained from the output lead 50 of the adder 24 which corresponds to A sin $(wt - \theta)$. It will be realized that these are the same output signals obtained from the converter 20 of FIG. 1. How these signals may be obtained will now be explained by means of the phasor diagram of FIG. 3. For the diagrams of FIGS. 3 and 4 it is assumed that the carrier wave sin wt is constant in frequency and amplitude as will be evident from the diagram of FIG. 1.

Figure 3:
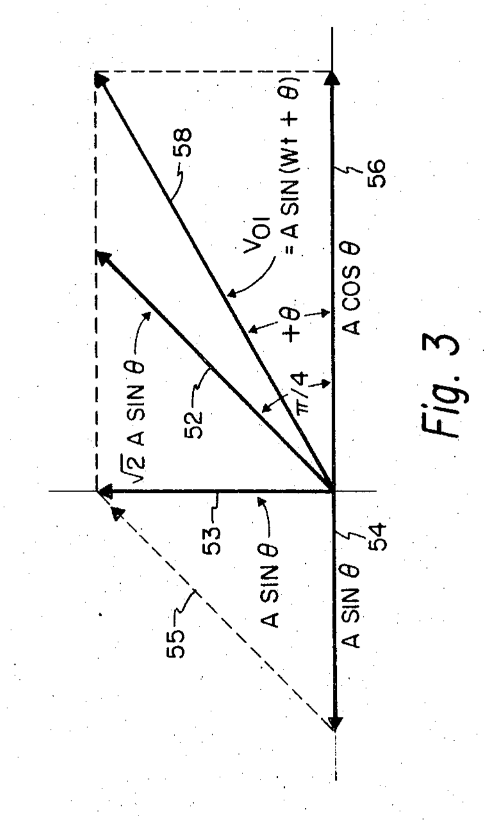

Referring now to FIG. 3 the vector 52 corresponds to a signal $\sqrt{2}$ A sin $\theta$. This is the signal obtained from the network 40, 41 which provides a 45° phase shift. It is therefore plotted at a 45° angle as shown. It will be noted that the carrier wave has been omitted from the designations of the phasor diagram of FIG. 3. The vector 53 corresponds to a 90° phase shift and corresponds to A and $\theta$. This is the vector needed to obtain the desired output signal $V_{01}$ or A sin ($wt + \theta$). In order to construct this vector one plots a vector 54 corresponding to $-$ A sin $\theta$. The vector 53 is obtained by combining vector 54 with a vector 55 shown in dotted lines which is equivalent to vector 52.

Having obtained the vector 53 corresponding to the 90° phase shift, this vector may now be combined with a vector 56 corresponding to A cos $\theta$. The resultant of vectors 53 and 56 is the vector 58 which is $V_{01}$ as previously explained.

Figure 2:
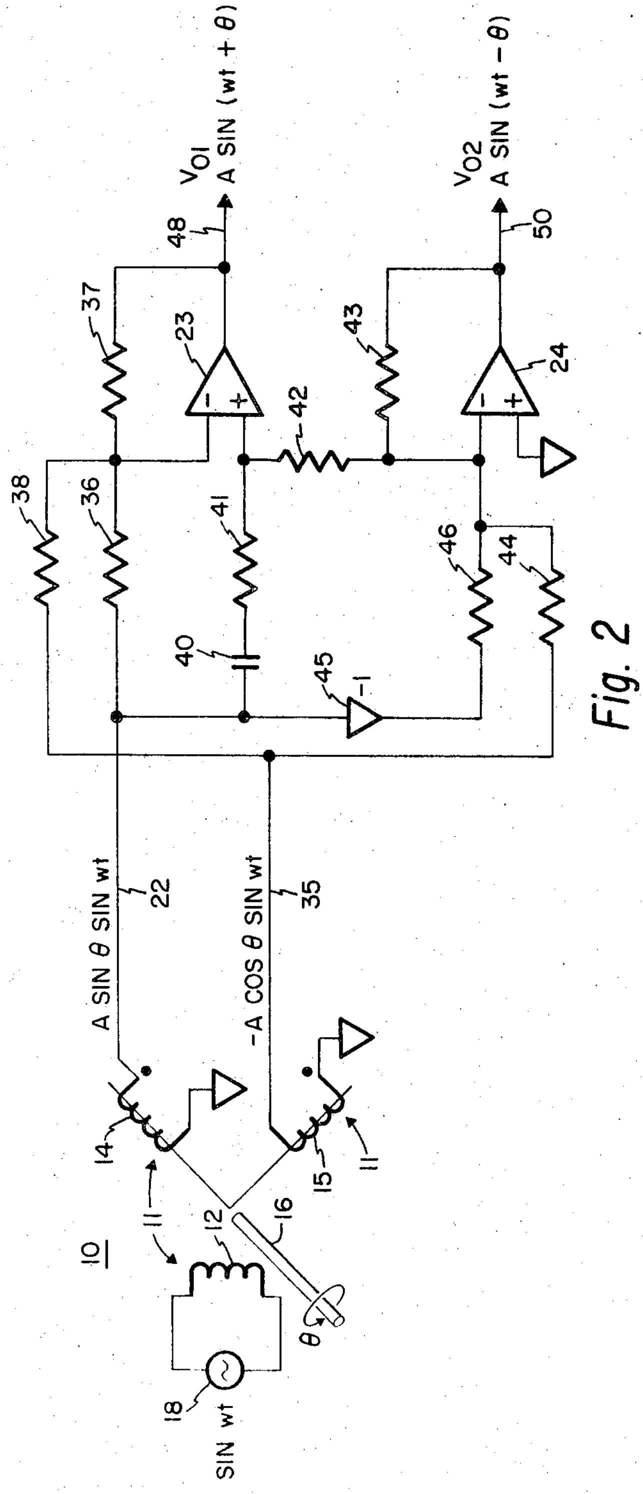
FIG. 2 is a circuit diagram of an amplitude-to-phase conversion circuit according to the present invention utilizing a single capacitor and which may form part of the system of FIG. 1.

To repeat the explanation with respect to FIG. 2 the vector 52 corresponds to the output of the network 40, 41. The vector 54 corresponds to the negative signal obtained from resistor 36 which is impressed on the negative input terminal of the adder. This will then yield the vector 53 as explained before which is combined with vector 56 corresponding to the output signal obtained from resistor 38 and applied to the negative input terminal of adder 23.

Figure 4:
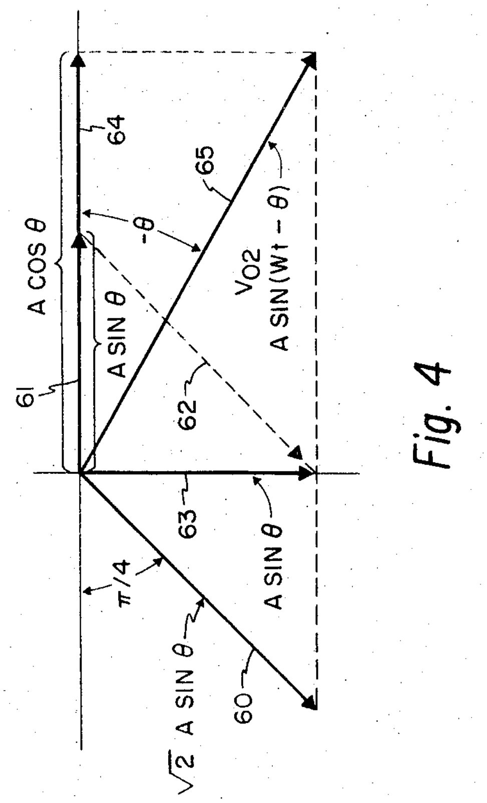
FIGS. 3 and 4 are phasor diagrams for explaining the operation of the circuit of FIG. 2, the diagram of FIG. 3 explaining how the first phase-shifted output signal is obtained while the diagram of FIG. 4 relates to the second output signal.

Similarly, the phasor diagram of FIG. 4 shows how the output signal $V_{02}$ is obtained. In this case we first plot the vector 60 corresponding again to $\sqrt{2}$ A sin $\theta$. This is the 45° phase-shifted signal obtained from network 40, 41 and 42. Since it is impressed on the negative input terminal of the adder 24, it has been plotted in the negative sense. The next vector 61 corresponds to A sin $\theta$. This is obtained from inverter 45, resistor 46 and the negative input terminal 24. It is accordingly plotted in a positive direction. By drawing the auxiliary vector 62 parallel to the vector 60 the desired vector 63 is obtained, viz. A sin $\theta$. This is the desired 90° phase shift. The vector 63 is combined with the vector 64 corresponding to A cos $\theta$, which is obtained from resistor 44. It will be noted that the negative signal from lead 45 is made positive because it is applied to the negative input terminal of the adder 24.

The resultant vectors 63 and 64 is vector 65 which is the desired signal $V_{02}$ or A sin ($wt - \theta$).

Depending on the selection of the values of the resistive network of FIG. 2 the voltage gain of the network may be adjusted. Assume, however, that a unity gain is desired, the network should have the following values. The resistances of resistors 36, 37 and 38 should be equal. The resistance of resistor 42 should be two times that of resistor 41. Resistors 44, 46 and 43 should be equal and equal to two times the combined resistances of resistors 41 and 42. Finally, the admittance of the capacitor 40 ($\omega C$) at the carrier frequency multiplied by the combined resistance of resistors 41 and 42 should be unity.

It should be noted that these resistance values are readily obtained commercially and they are easy to match.

On the other hand, the value of capacitor 40 changes with time due to aging. Assuming a long time stability of the values of all of the resistors of 0.03 percent; this value is obtained with the assumption that the resistors are precision resistors with a variation of 0.01 percent and a temperature coefficient of one part per million. On the other hand, the long time stability of the capacitor may be between 0.5 and 1 percent. Thus assuming the larger capacitance drift of 1 percent the phase error amounts to 0.025° electrical or less depending on the encoded angle. This is at least one order of magnitude smaller than the corresponding error obtained with a conversion circuit disclosed in the Kronacher patent previously referred to. This increase in acccuracy is primarily due to the face that the capacitor 40 is connected to both adders 23 and 24 so that a change of its value is substantially cancelled.

Specifically, the same variation enters into the output signals in opposite senses.

Figure 5:
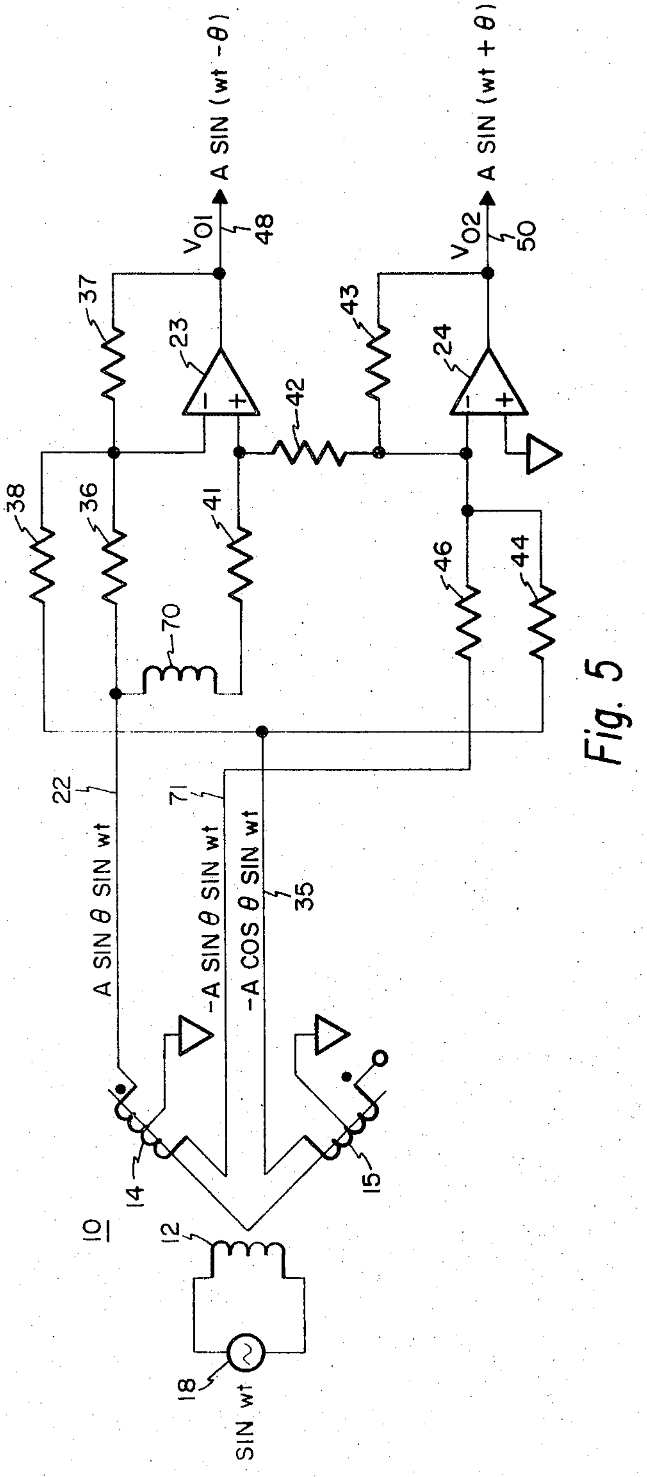
FIG. 5 is a circuit diagram of a modified amplitude-to-phase conversion circuit in accordance with the present invention and utilizing a single inductor.

Referring now to FIG. 5 there is illustrated a modified amplitude-to-phase converter in accordance with the present invention. The phase converter of FIG. 5 is characterized in that the capacitor 40 is replaced by an inductor 70. Furthermore, the various amplitude modulated carrier waves obtained from the resolver 10 are now derived in a slightly different manner.

The secondary winding 14 has one output lead 22 on which again appears the signal A sin $\theta$sin $wt$. However, in this case the center tap of winding 14 is grounded. The opposite terminal of the winding 14 is connected to an output lead 71 on which the signal $-$A sin $\theta$ sin $wt$ appears. Similarly, the secondary winding 15 has its center tap grounded. One terminal is connected to the output lead 35 on which the signal $-$A cos $\theta$ sin $wt$ appears. The other terminal of the winding 15 is not used.

As previously described the output lead 22 is connected to the negative input terminal of the adder 23 by resistor 36. The same input lead is connected by the series combination of inductor 70 and resistor 41 to the positive input terminal of the adder 23. The connection between output lead 35 and the negative terminal of the adder 23 is effected again by resistor 38.

The negative signal obtained from lead 71 is connected to the negative input terminal of adder 24 by resistor 46. The 45° phase shifted signal is also applied to the negative input terminal of adder 24 by resistor 42. Finally, the negative signal from lead 35 is applied to the negative input terminal adder 24 by resistor 44.

It will be noted that there is no need to utilize an inverter as shown at 45 in FIG. 2 because the negative signal is obtained from the output lead 71.

It will be understood that the circuit of FIG. 5 operates in the same manner as does that of FIG. 2. Again the voltage gain of the network may be adjusted to obtain any desired value. If a unity voltage gain is desired the resistance relationships previously indicated apply. In this case, however, the admittance of the inductor 70 ($1/\omega L$) at the carrier angular frequency multiplied by the sum of the resistances of resistors 41 and 42 should be unity.

There has thus been disclosed an amplitude-to-phase conversion circuit which is characterized by an accuracy an order of magnitude greater than that of prior art circuits without temperature compensation. The conversion circuit of the invention requires a resistive network having values which are readily obtainable on the open market. Its accuracy is due to the fact that the conversion circuit requires but a single reactive impedance element so that its variations due to aging or temperature changes are substantially compensated. This in turn means that it will normally not be necessary to provided temperature compensation which has been customary in the past. Finally, the conversion circuit of the present invention is characterized by greater simplicity because all it requires is eight resistors, one reactive impedance element and two adders.

What is claimed is:

1. An amplitude-to-phase conversion circuit comprising:

a carrier frequency source;

a resolver having an analog input shaft and a transformer having input and output terminals, said input terminals being coupled to said carrier source, a first output terminal producing a first output signal having an amplitude proportional to the sine of the angle of said analog shaft, and a second output terminal producing a second output signal having an amplitude proportional to the cosine of said shaft angle;

a first adder having two input terminals;

a second adder having two input terminals;

a purely resistive network interconnecting each of said resolver outputs with each of said input terminals of said adders; and a single phase shifting network connected between said first output terminal of said resolver and one input terminal of each of said adders, said phase shifting network including one resistor and a single reactive impedance element for shifting the phase of said first output signal substantially by 45°; said networks being so connected as to apply said second signal to said first adder, to apply said first signal shifted in phase by said phase shifting network to said first adder, and means including said adder to apply the negative of said first signal to said first adder, said networks being further so connected as to apply said second signal to said second adder, said first signal to said second adder, and means including said second adder to apply the negative of said phase-shifted first signal to said second adder, said networks and said adders being so arranged that said first adder generates a first resultant signal having a phase shifted in one sense with respect to the phase of said carrier source while said second adder generates a second resultant signal having a phase shifted in the opposite sense, said phase shifts corresponding to the angle of said input shaft, whereby undesired variations of the resultant signals due to variations of said reactive impedance element are substantially compensated.

2. A conversion circuit as defined in claim 1 wherein said reactive impedance element is a capacitor.

3. A conversion circuit as defined in claim 1 wherein said reactive impedance element is an inductor.

4. An amplitude-to-phase conversion circuit comprising:

a carrier frequency source;

a resolver having an analog input shaft and a transformer having input and output terminals, said input terminals being coupled to said carrier frequency source, a first output terminal generating a first output signal having amplitudes proportional to the sine of the angle of said input shaft, and a second output terminal generating a second output signal having amplitudes proportional to the cosine of said input shaft angle;

a first adder having two input terminals;

a second adder having two input terminals;

a first resistor connecting said first output terminal to a first input terminal of said first adder;

means coupled to said first resistor and including said transformer and said first adder for impressing the negative of said first output signal on said first adder;

a second resistor connecting said second output terminal to said first input terminal of said first adder;

a reactive impedance element and a third resistor connected in series between said first output terminal and the second input terminal of said first adder;

a fourth resistor connected between said first output terminal and a first input terminal of said second adder;

a fifth resistor connecting said second output terminal to said first input terminal of said second adder;

a sixth resistor connecting the second input terminal of said first adder to the first input terminal of said second adder; and means coupled to said sixth resistor and including said transformer and said second adder for impressing the negative of the signal shifted in phase by said reactive impedance element and said third resistor onto said second adder.

5. A conversion circuit as defined in claim 4 wherein said reactive impedance element is a capacitor.

6. A conversion circuit as defined in claim 4 wherein said reactive impedance element is an inductor.

7. A conversion circuit as defined in claim 5 wherein the resistance of said first resistor equals that of said second resistor, wherein the resistance of said third resistor is one half of that of said sixth resistor, wherein the resistance of said fourth resistor equals that of said fifth resistor and equals six times that of said third resistor, and wherein the admittance of said capacitor at said carrier frequency multiplied by the sum of the resistance of said thrid and sixth resistors equals unity.

8. A conversion circuit as defined in claim 7 wherein said first adder has a seventh resistor connected between its first input and its output terminals to provide a feedback path, and wherein said second adder has an eighth resistor connected between its first input and its output terminals to provide a feedback path, the resistance of said seventh resistor being equal to that of said first resistor and the resistance of said eighth resistor being equal to that of said fifth resistor.

9. A conversion circuit as defined in claim 6 wherein the resistance of said first and second resistors is equal, wherein the resistance of said third resistor is one half of that of said sixth resistor, wherein the resistance of said fourth resistor equals that of said fifth resistor and equals six times that of said third resistor, and wherein the admittance of said inductor at said carrier frequency multiplied by the combined resistances of said third and sixth resistors equals unity.

10. A conversion circuit as defined in claim 9 wherein said first adder has a seventh resistor connected between its first input and its output terminals to provide a feedback path, and wherein said second adder has an eighth resistor connected between its first input and its out terminals to provide a feedback path, the resistance of said seventh resistor being equal to that of said first resistor and the resistance of said eighth resistor being equal to that of said fifth resistor.

* * * * *